(No Model.)

J. S. ROWELL.
ROOF COVERING.

No. 597,916.  Patented Jan. 25, 1898.

Witnesses:
Geo. W. Young
N. E. Oliphant

Inventor:
J. S. Rowell,
By H. G. Underwood
Attorneys

UNITED STATES PATENT OFFICE.

JOHN S. ROWELL, OF BEAVER DAM, WISCONSIN.

ROOF-COVERING.

SPECIFICATION forming part of Letters Patent No. 597,916, dated January 25, 1898.

Application filed July 15, 1897. Serial No. 644,668. (No model.)

*To all whom it may concern:*

Be it known that I, JOHN S. ROWELL, a citizen of the United States, and a resident of Beaver Dam, in the county of Dodge and State of Wisconsin, have invented certain new and useful Improvements in Roof-Coverings; and I do hereby declare that the following is a full, clear, and exact description thereof.

My invention has for its object to provide simple, economical, and durable fireproof roof-covering. Therefore it consists in a combination and arrangement of certain materials on a roof, as well as in the method of applying said materials, as hereinafter set forth with reference to the accompanying drawings and subsequently claimed.

Figure 1:
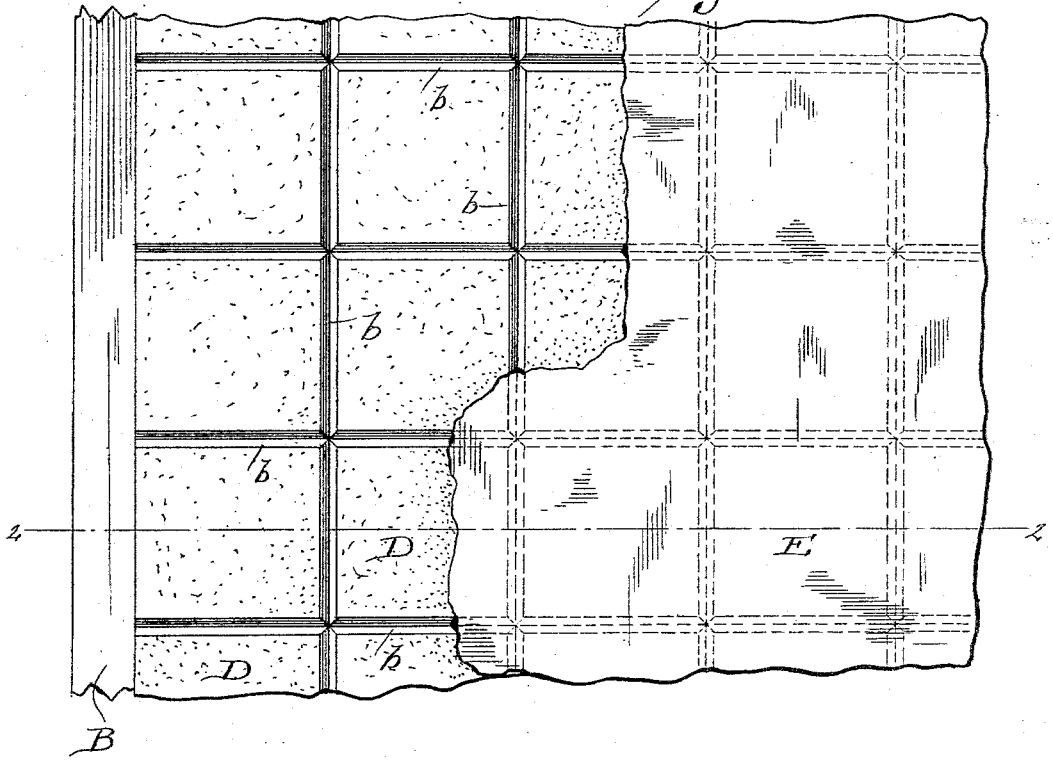
Figure 2:
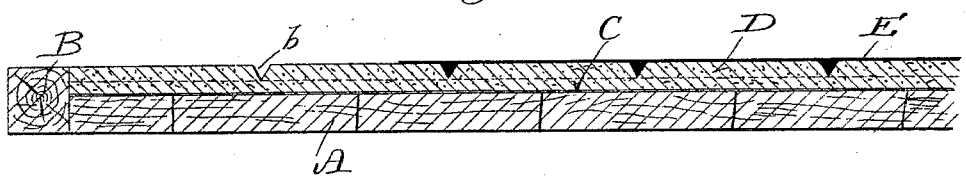

Figure 1 of the drawings represents a plan view of my improved roof-covering, partly broken away; and Fig. 2, a transverse section of the same indicated by line 2 2 in the preceding figure.

Referring by letter to the drawings, A represents an ordinary board roof having an upwardly-projecting border B, and said roof is preferably covered with a layer of building-paper C, that serves as a closure for any cracks or other openings that may exist.

Beginning at the border B a course of hydraulic cement in plastic condition is spread upon the layer of building-paper throughout the length of the roof to come flush with said border, this plastic course being of predetermined width—say one foot—a suitable gage being employed to mark the distance back from the aforesaid border. The gage is now set back on the roof a distance equal to the width of another course of plastic hydraulic cement, and the latter being spread longitudinal and transverse gutters *b* are formed at regular intervals apart in the two courses of said plastic cement. The work is continued as above described until the layer of building-paper is covered with a guttered layer D of the plastic cement, it being understood that the gutters in the latter layer are less than full depth of the same. The layer D is given sufficient time to set and dry out, any contraction that may take place being checked in the gutters, after which melted pitch or equivalent plastic is spread upon the hardened cement to cover the same and fill the gutters therein, the latter plastic layer E being then stiffened with a sprinkling of sand and run over with a heavy iron roller, the latter being the final operation in connection with the application of the roof-covering.

The compressed plastic layer E not only fills any cracks that may occur incidental to setting and drying out of the cement layer D, but it also yields to fill any cracks that may come about from subsequent expansion and contraction of said cement layer, such cracks being most likely to occur in the gutters, where the cement is thinnest.

While I have shown and described a preferred form of roof-covering, it may be practical in some instances to omit the layer of building-paper, the sand, or both, but the guttered layer of cement laid in a plastic condition and the layer of expansible plastic compressed upon the cement after the latter has set and dried are essential.

Having thus described my invention, what I claim as new, and desire to secure by Letters Patent, is—

1. A roof-covering comprising a lower layer of hydraulic cement having gutters formed in its surface, together with an upper layer of expansible material upon the hardened cement to cover the same and fill the gutters.

2. A roof-covering comprising a lower layer of hydraulic cement having gutters formed in its surface, an upper layer of expansible material upon the hardened cement to cover the same and fill the gutters, and a sprinkling of sand on the expansible layer.

3. A roof-covering comprising a layer of building-paper, a guttered layer of hydraulic cement on the paper, and a layer of expansible material covering the hardened cement and filling the gutters.

4. A method of covering roofs that consists in applying plastic hydraulic cement in courses, forming gutters in the surface of the cement, covering the cement when set and dry with expansible material, in plastic condition, and subsequently compressing the expansible material.

5. A method of covering roofs that consists in the application of a layer of building-paper, spreading courses of plastic hydraulic cement on the paper, forming gutters in the surface of the cement, covering the cement when set and dry with expansible material, in plastic condition, sprinkling the expansible material with sand, and subsequently compressing said sand-sprinkled material.

In testimony that I claim the foregoing I have hereunto set my hand, at Beaver Dam, in the county of Dodge and State of Wisconsin, in the presence of two witnesses.

JOHN S. ROWELL.

Witnesses:
W. H. STACY,
S. W. ROWELL.